(12) United States Patent  
Knowlton et al.

(10) Patent No.: US 8,438,301 B2  
(45) Date of Patent: May 7, 2013

(54) AUTOMATIC BIT RATE DETECTION AND THROTTLING

(75) Inventors: Christopher G. Knowlton, Redmond, WA (US); William James Staples, Duvall, WA (US); Michael D. Volodarsky, Philadelphia, PA (US); Bryan Ethan Fleming, Alexandria, VA (US); Geqiang Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 643 days.

(21) Appl. No.: 12/098,818

(22) Filed: Apr. 7, 2008

(65) Prior Publication Data

US 2010/0011119 A1    Jan. 14, 2010

Related U.S. Application Data

(60) Provisional application No. 60/974,704, filed on Sep. 24, 2007.

(51) Int. Cl.
   *G06F 15/16* (2006.01)

(52) U.S. Cl.
   USPC ........... 709/235; 709/228; 709/231; 709/232; 709/233

(58) Field of Classification Search .................... 709/235
   See application file for complete search history.

(56) References Cited

U.S. PATENT DOCUMENTS

| | | | |
|---|---|---|---|
| 5,115,430 A | 5/1992 | Hahne | |
| 5,280,503 A | 1/1994 | Betts | |
| 5,754,765 A | 5/1998 | Danneels et al. | |
| 5,754,865 A | 5/1998 | Danneels et al. | |
| 5,852,609 A | 12/1998 | Adams, III et al. | |
| 5,918,020 A * | 6/1999 | Blackard et al. | 709/228 |
| 5,928,330 A | 7/1999 | Goetz | |
| 6,633,918 B2 | 10/2003 | Agarwal et al. | |
| 6,961,341 B1 | 11/2005 | Krishnan | |
| 7,197,234 B1 | 3/2007 | Chatterton | |
| 7,209,443 B2 | 4/2007 | Mukai | |
| 7,260,635 B2 | 8/2007 | Pandya | |
| 7,953,194 B2 * | 5/2011 | Chen et al. | 375/354 |
| 2002/0133589 A1 | 9/2002 | Gubbi et al. | |
| 2002/0154694 A1 | 10/2002 | Birch | |

(Continued)

OTHER PUBLICATIONS

U.S. Appl. No. 12/143,535, Aug. 26, 2010, Office Action.

(Continued)

*Primary Examiner* — Richard G Keehn

(74) *Attorney, Agent, or Firm* — Workman Nydegger

(57) ABSTRACT

A computer system receives a request from a client computer system for data that is to be presented to a user, accesses a portion of the requested data and determines the encoded bit rate from the accessed portion of requested data. Based on the encoded bit rate for the requested data, the computer system determines an initial amount of data that is to be transferred to the client computer system to enable prompt access to that portion of data and determines the transfer rate for transferring the remaining data to the client computer system. The transfer rate for the remaining data is lower than the transfer rate for the initial amount. The computer system transfers the initial amount of data to the client computer system and transfers the remainder of the requested data to the client computer system at the determined lower transfer rate, subsequent to transferring the initial amount.

22 Claims, 5 Drawing Sheets

U.S. PATENT DOCUMENTS

| | | | |
|---|---|---|---|
| 2003/0236906 A1* | 12/2003 | Klemets et al. | 709/231 |
| 2004/0100903 A1 | 5/2004 | Han | |
| 2004/0103189 A1 | 5/2004 | Cherkasova et al. | |
| 2004/0223184 A1* | 11/2004 | Kusumoto et al. | 358/1.15 |
| 2005/0021621 A1* | 1/2005 | Welch et al. | 709/204 |
| 2005/0033879 A1* | 2/2005 | Hwang et al. | 710/52 |
| 2005/0044166 A1* | 2/2005 | Colville et al. | 709/215 |
| 2005/0071881 A1 | 3/2005 | Deshpande | |
| 2005/0094640 A1* | 5/2005 | Howe | 370/395.1 |
| 2005/0120131 A1 | 6/2005 | Allen | |
| 2005/0207569 A1* | 9/2005 | Zhang et al. | 380/28 |
| 2005/0276284 A1* | 12/2005 | Krause et al. | 370/538 |
| 2006/0050970 A1 | 3/2006 | Gunatilake | |
| 2006/0095401 A1* | 5/2006 | Krikorian et al. | 707/1 |
| 2006/0165166 A1 | 7/2006 | Chou et al. | |
| 2007/0002946 A1* | 1/2007 | Bouton et al. | 375/240.01 |
| 2007/0011343 A1 | 1/2007 | Davis et al. | |
| 2007/0016688 A1 | 1/2007 | Hester | |
| 2007/0053446 A1* | 3/2007 | Spilo | 375/259 |
| 2007/0058730 A1 | 3/2007 | Bowra et al. | |
| 2007/0169161 A1* | 7/2007 | Kienzle et al. | 725/115 |
| 2008/0049787 A1 | 2/2008 | McNaughton | |
| 2008/0056135 A1 | 3/2008 | Lee | |
| 2008/0186849 A1* | 8/2008 | Kampmann et al. | 370/232 |
| 2009/0070482 A1* | 3/2009 | Hickmott et al. | 709/233 |
| 2009/0161765 A1 | 6/2009 | Joyce | |
| 2009/0319681 A1 | 12/2009 | Freelander | |

OTHER PUBLICATIONS

"Bit Rate Throttling Configuration Walkthrough" Nov. 23, 2007 (16 pages).

"Providing Quality of Service on the Web Using Bandwidth Throttling" 1998 (11 pages).

Firfox Throttle—Bandwidth Utilization Throttling Plug-in for Firefox http://www.windowsreference.com/windows-xp/firefox-throttle-bandwidth-utilization-throttling-plug-in-for-firefox/ (6 pages).

JspISAPI 1.0 http://pcwin.com/Internet/Tools_Utilities/JspISAPI/index.htm Jan. 21, 2004 (2 pages).

RFC2001, "TCP Slow Start, Congestion Avoidance, Fast Retransmit, and Fast Recovery Algorithms". Internet Engineering Task Force (IETF), Request for Comments (RFC). <http://datatracker.ietf.org/doc/rfc2001/>. Published: Jan. 1997.

U.S. Appl. No. 12/143,535, Oct. 14, 2010, Office Action.

Bit Rate Throttling Setup Walkthrough (3 pages) http://www.iis.net/articles/view.aspx/IIS7/Managing-IIS7/Media-in-IIS7/Bit-Rate-Throttling-Setup-Walkthrough.

WebShare 242W Wireless ADSL2+ Router (2 pages) http://www.atlantisland.it/scheda_tecnica/4236_A02-RA242-W54_SE.pdf.

Video coding for streaming media delivery on the Internet (13 pages) http://ieeexplore.ieee.org/iel5/76/19666/00911155.pdf?tp=&isnumber=19666&arnumber=911155.

U.S. Appl. No. 12/143,535, Apr. 12, 2012, Notice of Allowance.

* cited by examiner

AUTOMATIC BIT RATE DETECTION AND THROTTLING

CROSS REFERENCE TO RELATED APPLICATIONS

This application claims the benefit of U.S. Provisional Application No. 60/974,704 entitled "Automatic Bit Rate Detection and Throttling" filed on Sep. 24, 2007.

BACKGROUND

As the internet grows in popularity, an increasing number of bandwidth-intensive applications are being used. Videos, songs, games and other software applications put an ever increasing demand on web servers to provide content on a steady and reliable basis. Content servers typically provide users the content upon the user's request. For example, if a user wishes to view an online video, the user will click on a hyperlink (or, in some cases, on the video itself) and the content server will begin to download the video contents to the user's computer.

Some content servers are configured to stream content to a user. For example, a user might input a connection type such as dial-up, digital subscriber line (DSL), cable, T1, etc. and the content server will set up a control channel between the user and the server to stream the content at a predetermined rate based on the connection type. During the course of the data streaming, the established control channel is maintained between the user and the server. In many instances, however, content is not streamed from a server to a user. Rather, content servers often operate on a send and forget basis, where no control channel is established between the server and the user.

In many cases, content servers provide content to a client system as fast as the data connection will allow. In media playback scenarios, the excess data transferred to the client is cached in system memory. Storing this excess data places an increased burden on client system resources, especially in cases where such resources are limited. For example, mobile devices, such as a cellular phone or personal digital assistant (PDA) may have limited memory for storing such data. Moreover, transferring this extra data is often unnecessary as many users will terminate playback of a media file well before the file has been played in its entirety.

BRIEF SUMMARY

Embodiments described herein are directed to optimizing data flow based on the data's encoded bit rate. In one embodiment, a computer system receives a request from a client computer system for data that is to be presented to a user at the client computer system. The computer system accesses a portion of the requested data and determines the encoded bit rate from the accessed portion of the requested data. Based on the encoded bit rate for the requested data, the computer system determines an initial amount of data that is to be transferred to the client computer system to enable prompt access to that portion of data and determines the transfer rate for transferring the remaining data to the client computer system, where the transfer rate for the remaining data is lower than the transfer rate for the initial amount. The computer system transfers the initial amount of data to the client computer system and transfers the remainder of the requested data to the client computer system at the determined lower transfer rate, subsequent to transferring the initial amount.

In another embodiment, a computer system receives a request from a client computer system requesting access to a media file for presentation at the client computer system. The computer system accesses a portion of the media file and determines the media file's encoded bit rate from the accessed portion of the media file. Based on the determined encoded bit rate, the computer system determines an initial amount of media file data that is to be transferred to the client computer system, such that the client computer system can begin prompt playback of the media file, and determines the transfer rate for transferring the remainder of the media file to the client computer system, where the transfer rate for the remainder is lower than the transfer rate for the initial amount. Next, the computer system transfers the initial amount of media file data to the client computer system and transfers the remainder of the media file data to the client computer system at the determined lower transfer rate, subsequent to transferring the initial amount. The computer system receives an indication that the user has terminated playback of the media file and ceases data transfer to the client computer system, so that bandwidth and server resources are conserved.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
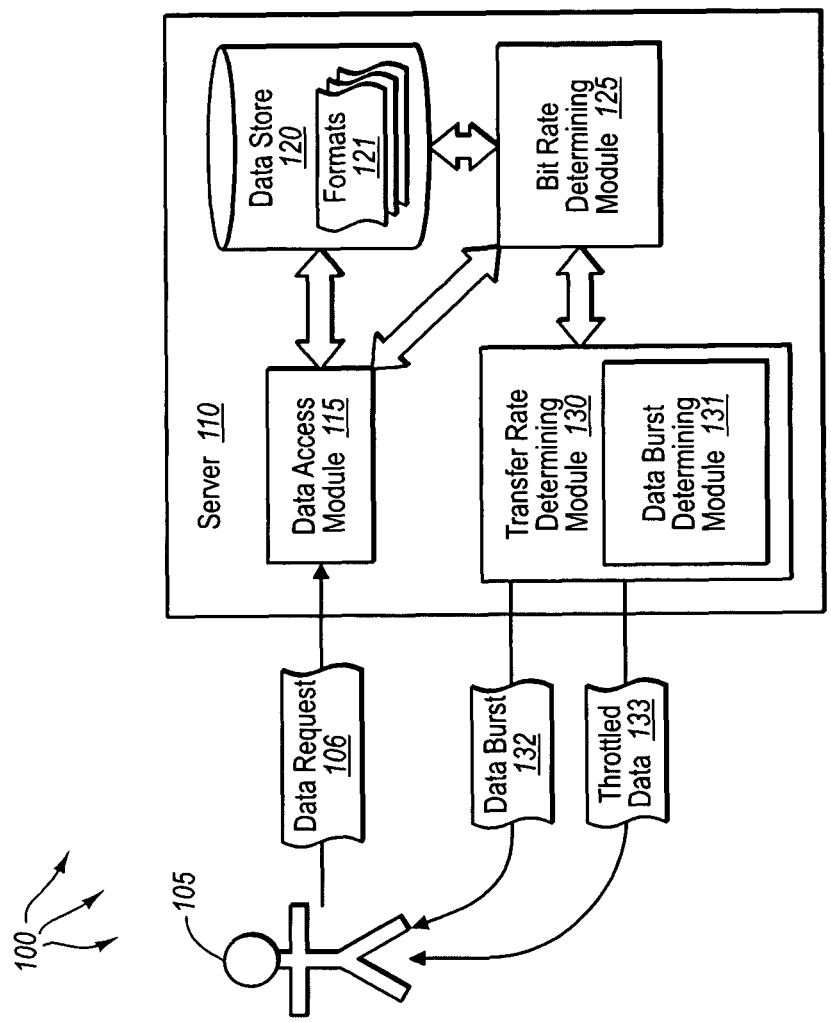
FIG. 1 illustrates a computer architecture in which embodiments of the present invention may operate including optimizing data flow based on the data's encoded bit rate.

Embodiments described herein are directed to optimizing data flow based on the data's encoded bit rate. In one embodiment, a computer system receives a request from a client computer system for data that is to be presented to a user at the client computer system. The computer system accesses a portion of the requested data and determines the encoded bit rate from the accessed portion of the requested data. Based on the encoded bit rate for the requested data, the computer system determines an initial amount of data that is to be transferred to the client computer system to enable prompt access to that portion of data and determines the transfer rate for transferring the remaining data to the client computer system, where the transfer rate for the remaining data is lower than the transfer rate for the initial amount. The computer system transfers the initial amount of data to the client computer system and transfers the remainder of the requested data to the client computer system at the determined lower transfer rate, subsequent to transferring the initial amount.

In another embodiment, a computer system receives a request from a client computer system requesting access to a media file for presentation at the client computer system. The computer system accesses a portion of the media file and determines the media file's encoded bit rate from the accessed portion of the media file. Based on the determined encoded bit rate, the computer system determines an initial amount of media file data that is to be transferred to the client computer system, such that the client computer system can begin prompt playback of the media file, and determines the transfer rate for transferring the remainder of the media file to the client computer system, where the transfer rate for the remainder is lower than the transfer rate for the initial amount. Next, the computer system transfers the initial amount of media file data to the client computer system and transfers the remainder of the media file data to the client computer system at the determined lower transfer rate, subsequent to transferring the initial amount. The computer system receives an indication that the user has terminated playback of the media file and ceases data transfer to the client computer system, so that bandwidth and server resources are conserved.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes computer system 110. In some embodiments, computer system 110 may be a computer server configured to communicate with multiple client computer systems. For example, user 105 may connect a client computer system to server 110. Over such a connection, user 105 may send data request 106. Data request 106 may include a request for computer data. The data may include one or more data files. The data files may be of the same or varying types. For example, the data may include various data types such as audio, video, or other data types. Such data types may also include a variety of data formats such as .mpeg, .mp3, .wav, .flv, or any other type of file or file format.

The client system's connection to server 110 may be a "send and forget" type of connection where no control channel is maintained between the server computer system and the client computer system. Whereas in some data streaming environments a control channel is maintained at all times between the server and the client, in some embodiments herein, no control channel is maintained between server 110 and a client computer system used by user 105. Such connections are often used in web server/client data transfers.

Server 110 may receive data request 106 at data access module 115. Data access module may be configured to communicate with data store 120. Data store 120 may include various data files of various formats 121. Data store 120 may comprise a single unit or multiple storage units spread over multiple storage devices. In some embodiments, these storage devices may be spread over multiple computer systems in various physical locations. Data access module 115 may also be configured to communicate with bit rate determining module 125, and pass along data request 106. Bit rate determining module 125 may receive data request 106 and access one or more data files on data store 120 based on the request. From the accessed data, module 125 may determine an encoded bit rate for the data by examining either or both of the data file headers and the data itself This will be explained in greater detail below.

Bit rate determining module 125 may pass a determined bit rate for the requested data to transfer rate determining module 130. Transfer rate determining module 130 may be configured to receive data and determine, from the encoded bit rate, an optimum transfer rate for the file data. For example, bandwidth may be saved by transferring the requested data to user 105 at the encoded bit rate or slightly above the encoded bit rate. In some embodiments, a burst of data may be sent to user 105 using the client-server connection's maximum transfer capacity. The data burst 132 may be equivalent to a given playback time for the requested data. For example, data burst 132 may be equivalent to 30 seconds of playback for a particular file. This burst length is variable and customizable. Additionally or alternatively, the data burst may be described in terms of bit (or byte) size. For example, data burst determining module may determine from the encoded bit rate, or from the overall size in bytes, that an appropriate burst amount is 5 MB. Other means of burst size or duration will be described in further detail below.

In some embodiments, after data burst 132 is sent to user 105, the remainder of the data file(s) will be transferred at a reduced rate (i.e. a throttled rate) based on the file's encoded bit rate. In some cases, server 10 may be in constant or continuous communication with user 105 and may be able to determine when the user has paused or terminated playback of the data file. In such cases, it may be possible to conserve bandwidth by refraining from transferring more data than is necessary. For example, if user 105 is viewing media content and stops playback (either by pressing a "stop" button on a media player or by closing the media player application) during the portion downloaded in the data burst, the throttled data 133 may not be transferred at all, or may be transferred only when it is determined that the user is still viewing beyond what was downloaded in the data burst. These and other concepts will be explained further in relation to methods 200 and 300 of FIGS. 2 and 3, respectively.

Figure 2:
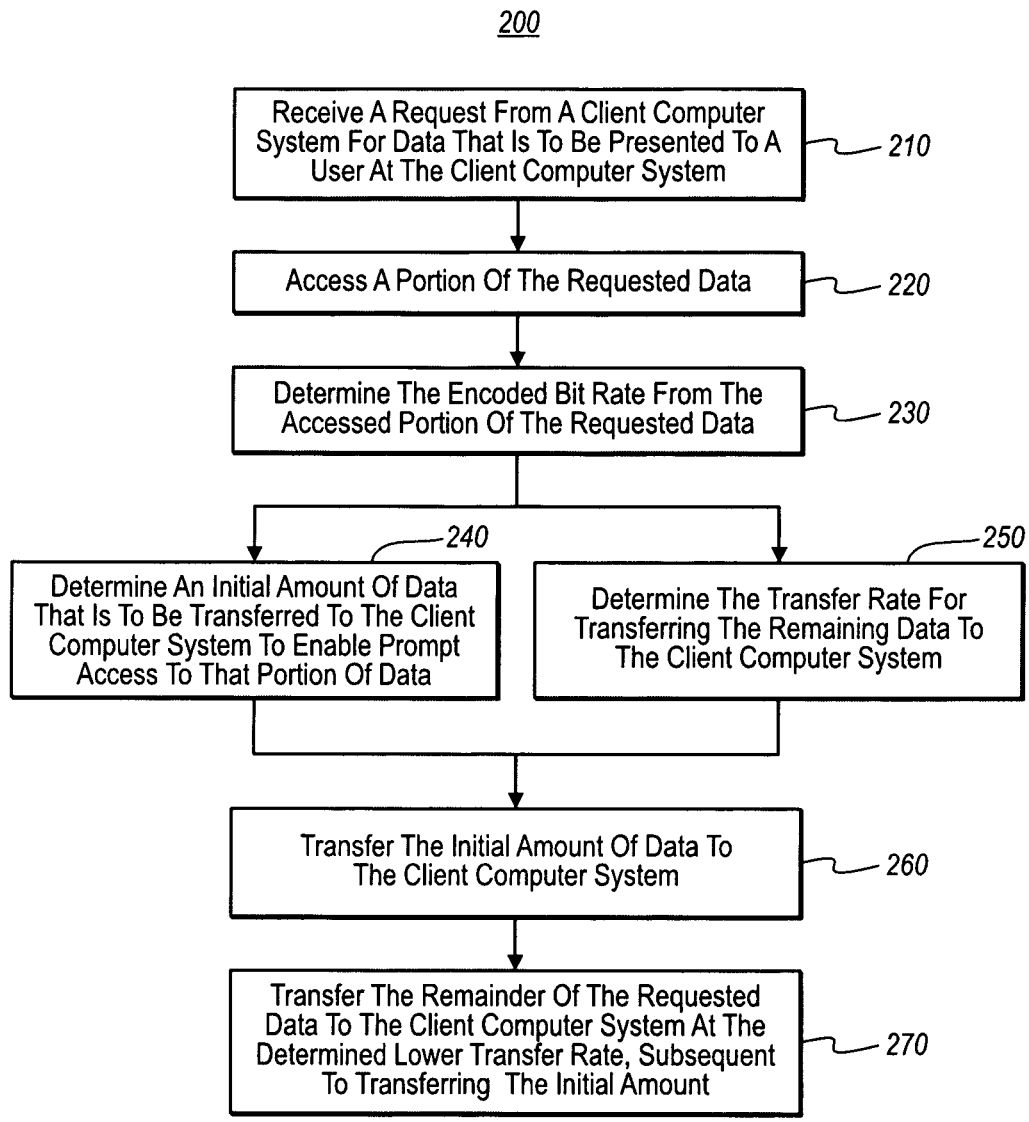
FIG. 2 illustrates a flowchart of an example method for optimizing data flow based on the data's encoded bit rate.
Figure 4:
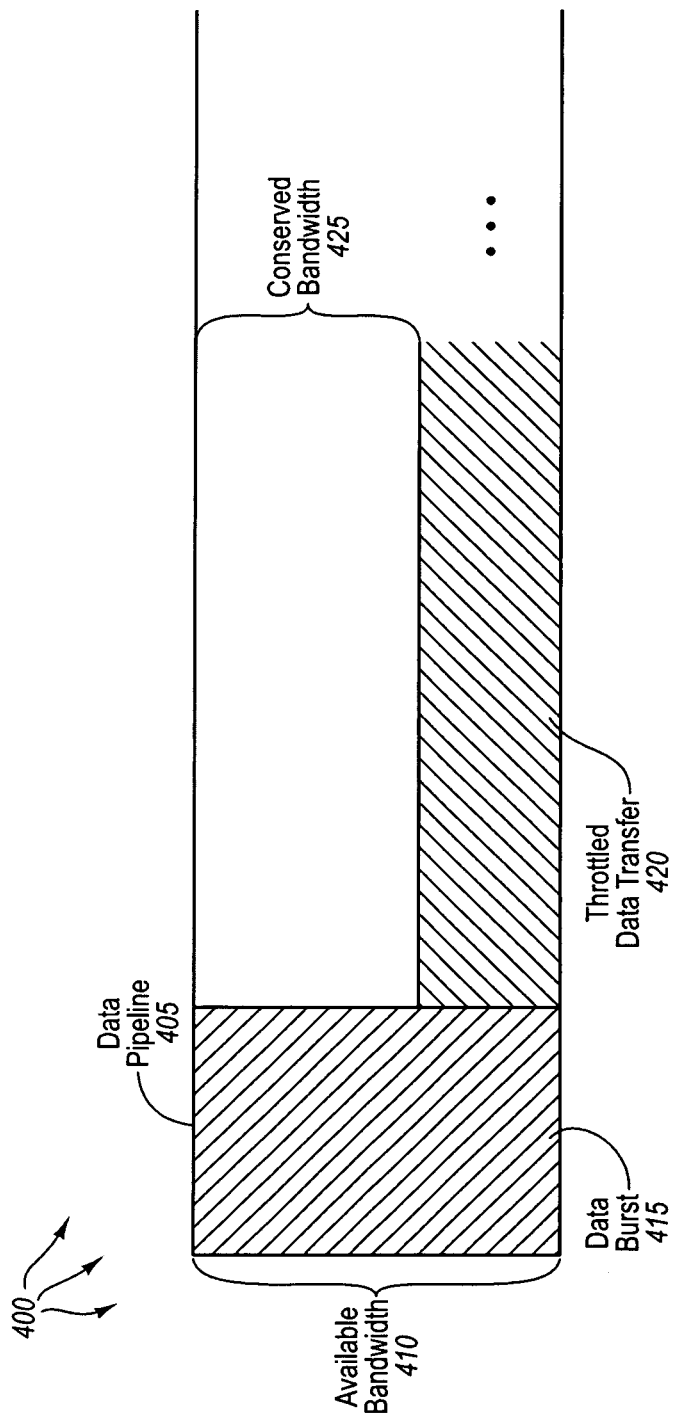
FIG. 4 illustrates a data pipeline architecture in which embodiments of the present invention may operate.

FIG. 2 illustrates a flowchart of a method 200 for optimizing data flow based on the data's encoded bit rate. FIG. 4 illustrates a data pipeline architecture with various communication elements. The method 200 will now be described with frequent reference to the components and data of environment 100 of FIG. 1 and architecture 400 of FIG. 4.

Method 200 includes an act of receiving a request from a client computer system for data that is to be presented to a user at the client computer system (act 210). For example, data access module 115 may receive data request 106 from a client computer system for data that is to be presented to user 105 at the client computer system. As indicated above, data request 106 may include a request for any type of data in any format. The data may be stored in data store 120, which can include a single storage unit such as a hard drive, or may include an entire distributed database encompassing multiple computer systems in various physical locations.

Method 200 includes an act of accessing a portion of the requested data (act 220). For example, data access module 115 may access at least a portion of the data requested in data request 106. In some cases, the requested data may include a file header, metadata, or other information describing the data itself For example, accessing the data may include parsing header information included in the data for information usable to determine the data portion's encoded bit rate. In some cases, a requested data file's header may include the file's encoded bit rate in encrypted or clear text form. In other cases, the requested data file's header may include playback duration information, file type, overall size in bytes, or other information useful in determining optimum data burst size and/or optimum transfer rate. In cases where such information is encrypted in a file header, decryption may be performed to determine either the encoded bit rate or information that may be used in calculating the encoded bit rate for the requested data.

Method 200 includes an act of determining the encoded bit rate from the accessed portion of the requested data (act 230). For example, bit rate determining module 125 may determine the encoded bit rate from the accessed portion of the requested data. In some cases, determining the encoded bit rate includes dividing the overall size of the data portion by the playback duration of the data portion. For example, bit rate determining module 125 may be configured to access information in a file header or metadata. The information may include the overall file size and the playback duration of the data file. Once the overall file size and playback duration are known, the encoded bit rate may be determined by dividing the overall size of the data file (in bytes) by the playback duration in minutes or seconds. This result would yield a number in bytes per time period, or in other words, an encoded bit rate. In some cases, bit rate determining module 125 may be configured to cache one or more portions of the accessed information, such that the cached portions may be used at a later time in determining a data portion's encoded bit rate.

Method 200 includes an act of, based on the encoded bit rate for the requested data, determining an initial amount of data that is to be transferred to the client computer system to enable prompt access to that portion of data (act 240). For example, data burst determining module 131 may determine an initial amount of data (e.g. a data burst) that is to be transferred to the client computer system to enable prompt access to that portion of data. The initial amount of data (e.g. data burst 132) from a data file may be transferred to user 105 at the maximum available transfer rate. Depending on network conditions, the burst may be transferred at a rate that is less than the maximum available. For example, if it is determined that higher priority data is to be simultaneously transferred, the initial burst may be transferred at a lower rate. However, transferring at the maximum rate ensures that the initial burst of data will arrive at the client system as quickly as possible. In some embodiments, the initial burst is designed to provide 20-30 seconds of playback time, after which the remainder of the data is transferred at the determined rate, based on the data's encoded bit rate.

Method 200 includes an act of, based on the encoded bit rate for the requested data, determining the transfer rate for transferring the remaining data to the client computer system, the transfer rate for the remaining data being lower than the transfer rate for the initial amount (act 250). For example, transfer rate determining module 130 may determine, based on the encoded bit rate for the requested data, the transfer rate for transferring the remaining data to the client computer system, where the transfer rate for the remaining data is lower than the transfer rate for the initial amount.

In some embodiments, an optimum transfer rate is a rate at or slightly above the encoded bit rate. For instance, if the encoded bit rate is determined to be 300 k/sec., an optimum transfer rate may be 300 k/sec. or 310 k/sec. In some cases, the transfer rate may be automatically set to a certain percentage of the encoded bit rate (e.g. 100%, 110%, etc.). Such a percentage is variable and fully customizable by a user. In other cases, the transfer rate may be determined based on the file type (e.g. video, audio, flash, etc.) or the format type (mpeg, mp3, wav, wmv, etc.). Certain file types or formats may be given higher or lower transfer rates depending on user preferences and user customizations.

In some embodiments, a user (e.g. user 105) may determine a maximum transfer rate for the client-server connection. In such cases, regardless of encoded bit rate, the file(s) would be transferred at a transfer rate at or below the set maximum transfer rate for the client-server connection. In some cases, if no encoded bit rate is detected or cannot be determined from the header/metadata, the transfer rate may be automatically set to the maximum allowable rate for the client-server connection.

Method 200 also includes an act of transferring the initial amount of data to the client computer system (act 260). For example, server 110 may transfer data burst 132 to the client computer system. In some cases, the initial amount of data may be determined based on the amount of data consumed in a certain time period according to the data portion's detected encoded bit rate. For example, the overall size of data burst 132 may be determined based on the amount of data consumed in 30 seconds of playback. The number of bits is simply the encoded bit rate (in bits or bytes/sec.) multiplied by the desired number of seconds. The time period is fully user-customizable or may be set by a server system administrator. As indicated above, the initial data burst may be transferred at the highest possible transfer rate for the client-server connections, based on available bandwidth at the time of the transfer.

Method 200 includes an act of transferring the remainder of the requested data to the client computer system at the determined lower transfer rate, subsequent to transferring the initial amount (act 270). For example, server 110 may transfer the remainder of the requested data (e.g. throttled data 133) to the client computer system at the determined lower transfer rate, subsequent to transferring the initial amount. As depicted in FIG. 4, data pipeline 405 may have a limited amount of available bandwidth 410. Data burst 415 may be sent using all or less than all of the available bandwidth. After the initial burst has been transferred, the remainder of the data may be transferred at the rate determined based on the file's encoded bit rate (e.g. throttled data transfer 420). By reducing the transfer rate after the initial burst, bandwidth may be conserved (e.g. conserved bandwidth 425), along with other system resources that would otherwise have been used to cache the transferred data.

In some cases, a user interface may be provided that allows a user to enter information including a data portion data type, size, encoded bit rate, playback duration, initial amount in total size, initial amount as a percent of the data portion's total size, an initial amount as a percentage of time based on the data portion's playback duration, and many other types of information and settings changes. All aspects of the data transfer may be customizable by either or both of user 105 and a server administrator.

Figure 3:
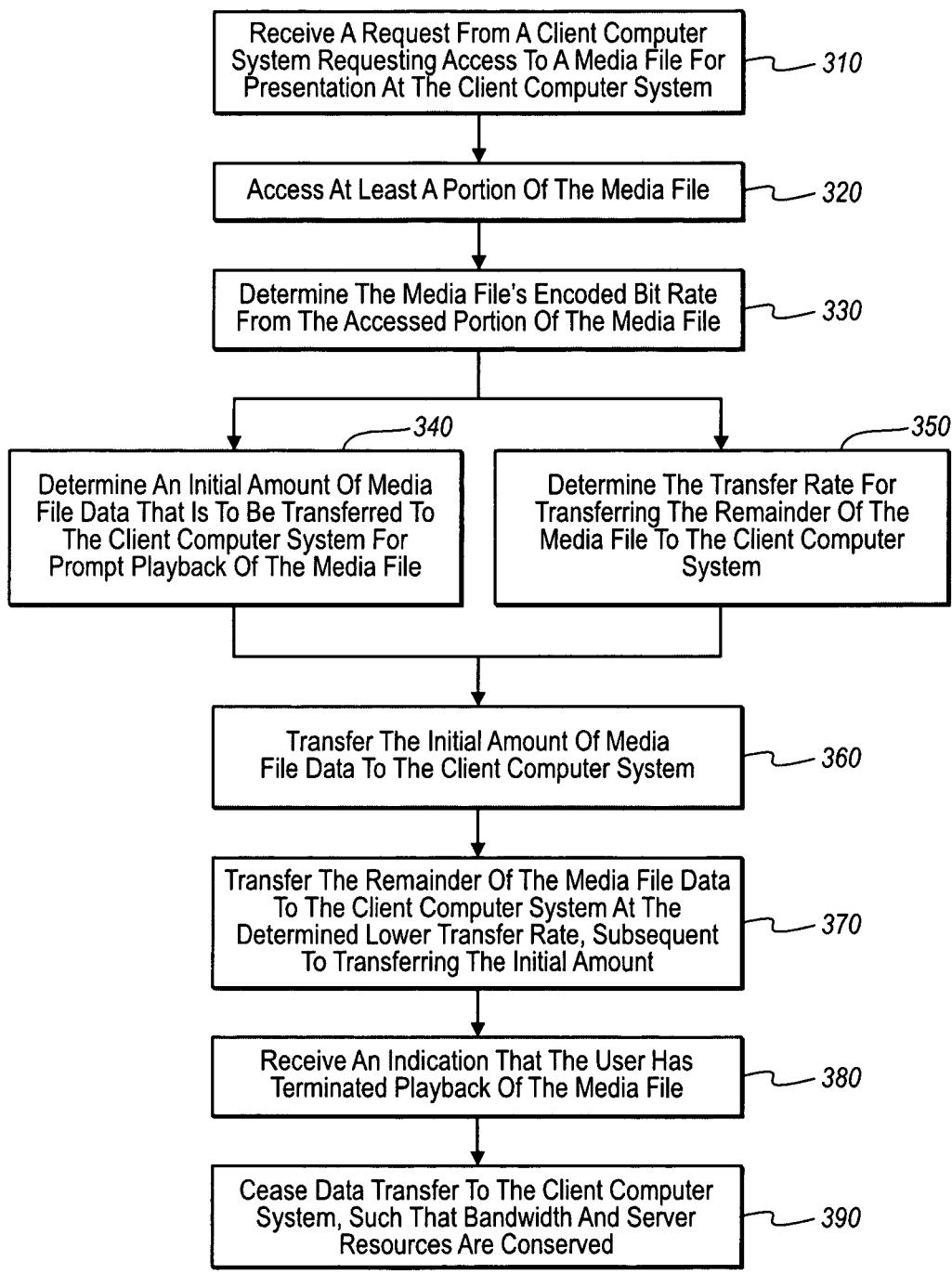
FIG. 3 illustrates a flowchart of an example method for optimizing media data flow from a web server to a client based on the data's encoded bit rate.
Figure 5:
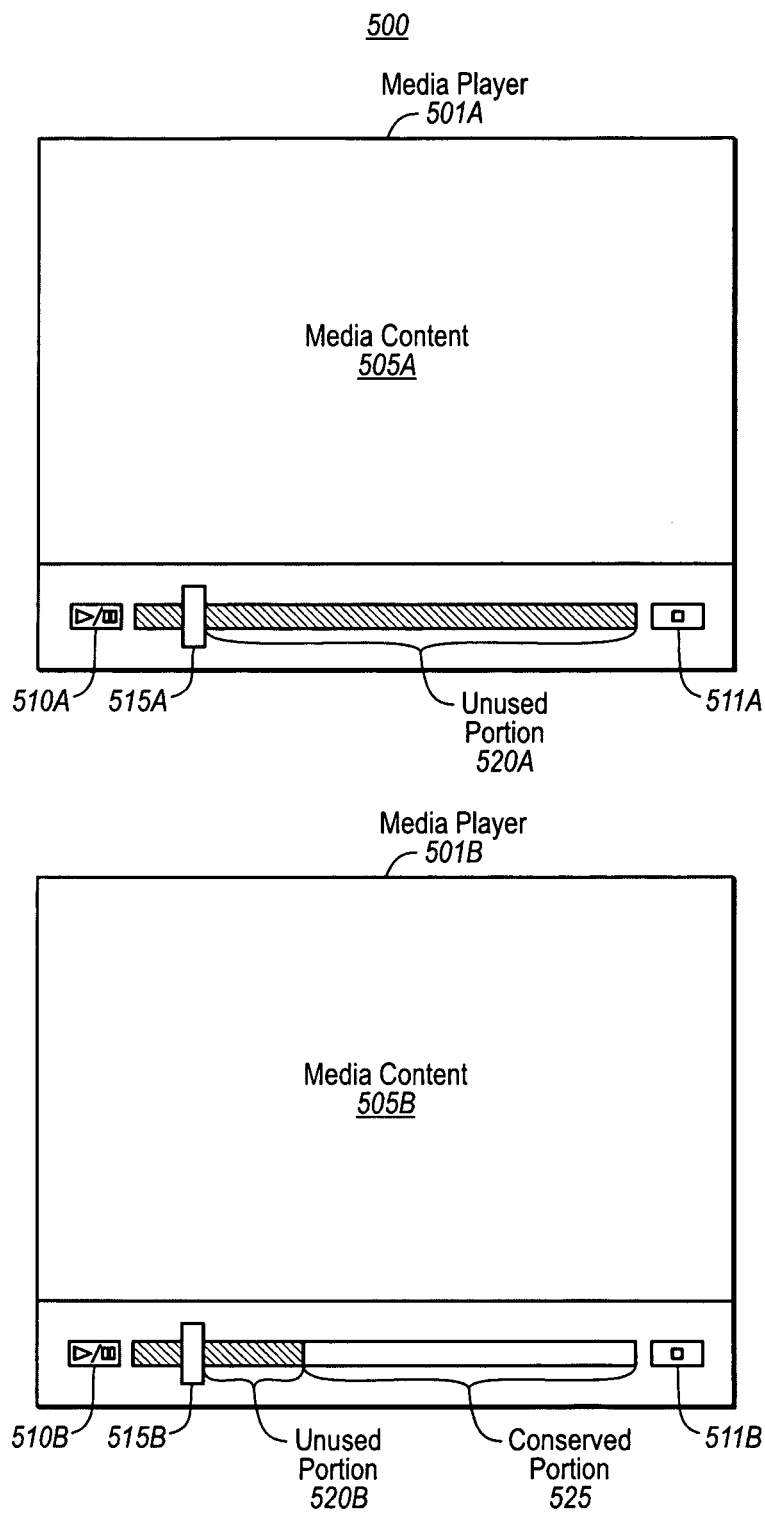
FIG. 5 illustrates two media players in which embodiments of the present invention may operate.

FIG. 3 illustrates a flowchart of a method 300 for optimizing media data flow from the web server to the client based on the data's encoded bit rate. FIG. 5 illustrates two media players configured to play back media files. The method 300 will now be described with frequent reference to the components and data of environments 100 of FIG. 1 and 500 of FIG. 5.

Method 300 includes an act of receiving a request from a client computer system requesting access to a media file for presentation at the client computer system (act 310). For example, data access module 115 may receive data request 106 from a client computer system requesting access to a media file for playback at the client computer system. The media file may be an audio file, a video file, a Flash™ animation or any other type of media file. In one example, as illustrated in FIG. 5, a user may request a video file to be displayed in media player 501A/501B.

Method 300 includes an act of accessing at least a portion of the media file (act 320). For example, data access module 115 may access at least a portion of the media file. The portion may include a header, metadata, or any other portion of the file.

Method 300 includes an act of determining the media file's encoded bit rate from the accessed portion of the media file (act 330). For example, bit rate determining module 125 may determine the media file's encoded bit rate from the header or metadata describing the media file. As indicated above, the encoded bit rate may be in clear text or encrypted form, or may be derivable from other information in the header/metadata such as overall file size or playback length. In some embodiments, a schema may be included in the media file that indicates how that media file's header is to be parsed such that the bit rate for the media file is detectable. Thus, in such cases, a third party may be able to add such information to the file header to ensure that the encoded bit rate is provided or is derivable, and may thus take advantage of the concepts disclosed herein.

Method 300 includes an act of, based on the determined encoded bit rate, determining an initial amount of media file data that is to be transferred to the client computer system, such that the client computer system can begin prompt playback of the media file (act 340). For example, data burst determining module 131 may determine, based on the encoded bit rate, an initial amount of media file data (e.g. data burst 132) that is to be transferred to the client computer system, thus enabling prompt playback of the media file on the client computer system. The initial burst may thus quickly provide a smooth opening time period where the media file plays with little chance of having to pause playback to wait for more of the media file to download. In some cases, the initial amount of media file data may be transferred at a high transfer rate that may be the highest possible transfer rate for the client-server connection.

Method 300 includes an act of, based on the determined encoded bit rate, determining the transfer rate for transferring the remainder of the media file to the client computer system, where the transfer rate for the remainder is lower than the transfer rate for the initial amount (act 350). For example, transfer rate determining module 130 may determine, based on the encoded bit rate, the transfer rate for transferring the remainder of the media file to the client computer system, where the transfer rate for the remainder is lower than the transfer rate for data burst 132. In some cases, the transfer rate may be throttled based on network conditions. Additionally or alternatively, the transfer rate may be throttled based on settings indicating that the transfer rate should be a certain percentage of the encoded bit rate (e.g. 110%).

Method 300 includes an act of transferring the initial amount of media file data to the client computer system (act 360). For example, as shown in FIG. 4, data burst 415 may be transferred to the client computer system at a high transfer rate. In some cases, the transfer rate may be the highest possible transfer rate for the data pipeline (405).

Method 300 includes an act of transferring the remainder of the media file data to the client computer system at the determined lower transfer rate, subsequent to transferring the initial amount (act 370). For example, as shown in FIG. 4, throttled data transfer 420 may transfer the remainder of the media file to the client computer system at the determined lower transfer rate, after transferring data burst 132. In some embodiments, the transfer rate for the remainder of the media file may be determined based on the physical, stored location of the media file. Thus, a user may specify for data files on a given hard drive, a given database, or in a given file folder what the transfer rate is to be for files stored in that location. In some cases, the transfer rate for the remainder of the media file is determined based on the available bandwidth between the client and the web server (e.g. server 110). Thus, in cases where more or less bandwidth is available, the transfer rate may be increased or decreased in proportion to the available bandwidth, if such is desired by the user. Furthermore, in some cases, the user may be able to set a desired transfer rate for each individual file stored in store 120.

Method 300 includes an act of receiving an indication that the user has terminated playback of the media file (act 380). For example, as shown in FIG. 5, a user may be viewing media content 505A and may pause playback using play/pause button 510A/510B or may stop playback using stop button 511A/511B. Alternatively, playback may be terminated by closing the media player.

Method 300 includes an act of ceasing data transfer to the client computer system, such that bandwidth and server resources are conserved (act 390). For example, server 110 may cease data transfer to the client computer system to conserve bandwidth and server resources, as well as client storage and processing resources. In many cases, once a client has requested a media file, the web server will download the entire file to the client. Thus, if the user terminates playback at point 515A, as indicated by the status bar, unused portion 520A will not get played, and is, in effect, wasted. In media player 501B, a user may initiate playback using play/pause button 510B and may view media content 505B up to, for example, point 515B as indicated by the status bar. If the user terminates playback at that point, only a small portion of data is unused (e.g. 520B) and the majority is conserved (e.g. 525), and is not transferred to the client.

In some embodiments, server 110 may be configured to detect that playback has been paused, rather than terminated, and may suspend transferring data until the play/pause button (e.g. 510B) is re-activated. This leads to a reduced burden on both the web server transferring the data and the client that is receiving the data. Using these principles, data transfer between a server and a client may be optimized for both the client and the server. Bandwidth and system resources are conserved while ensuring that the data is transferred at an optimum rate, based on the data's encoded bit rate.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer networking environment comprising a plurality of computing systems including a client computer system and a server computer system connected over a client-server connection, a method for optimizing data flow based on the data's encoded bit rate, the method comprising:

an act of a server computer system receiving a request from a client computer system for data that is to be transferred to the client computer system;

subsequent to receiving the request from the client computer system, an act of the server computer system accessing a portion of the requested data, the requested data including both an initial amount of data encoded at a bit rate to be transferred to the client computer system as an initial data burst, as well as remaining data encoded at the same bit rate as the initial amount of data to be transferred to the client computer system subsequent to the initial data burst;

an act of the server computer system determining the encoded bit rate of the requested data from the accessed portion of the requested data;

based on the determined encoded bit rate of the requested data:

an act of the server computer system determining a size of the initial amount of data that is to be transferred to the client computer system at the encoded bit rate and at a first transfer rate to enable prompt access to that portion of data, the first transfer rate being greater than the encoded bit rate; and prior to transferring the initial amount of data or the remaining data to the client computer system, an act of the server computer system determining a second transfer rate for transferring the remaining data to the client computer system, the second transfer rate for the remaining data being lower than the first transfer rate for the initial amount of data and equal to or greater than the encoded bit rate;

subsequent to determining the second transfer rate for transferring the remaining data to the client computer system, an act of the server computer system transferring the initial amount of data to the client computer system at the encoded bit rate and at the first transfer rate, which is greater than the encoded bit rate, as the initial data burst; and an act of the server computer system transferring the remainder of the requested data to the client computer system at the same encoded bit rate as the initial amount of data and at the second transfer rate which is lower than the first transfer rate, subsequent to transferring the initial amount of data at the encoded bit rate and at the first transfer rate.

2. The method of claim 1, wherein determining the encoded bit rate comprises dividing the overall size of the data portion by the playback duration of the data portion.

3. The method of claim 1, wherein accessing the data portion comprises parsing header information for information usable to determine the data portion's encoded bit rate, the header information corresponding to the data portion.

4. The method of claim 3, further comprising an act of the server computer system setting the second transfer rate to a percentage of the encoded bit rate determined from the header information.

5. The method of claim 1, further comprising an act of the server computer system preventing transfer of the remaining portion of the data to the client computer system upon determining that a user has terminated playback of the data at the client computer system.

6. The method of claim 1, further comprising an act of the server computer system decrypting an encrypted data file header to determine the encoded bit rate for the requested data.

7. The method of claim 1, wherein no control channel is maintained between the server computer system and the client computer system.

8. The method of claim 1, wherein the initial amount of data is determined based on the amount of data consumed in a certain time period according to the data portion's detected encoded bit rate.

9. The method of claim 1, wherein the size of the initial amount of data is specified by a user.

10. The method of claim 1, wherein the initial amount of data is transferred at the highest possible transfer rate for the client-server connection based on available bandwidth.

11. The method of claim 1, wherein one or more of the first transfer rate or the second transfer rate is determined based on the file type of the data portion.

12. The method of claim 1, wherein a computer user determines the first and second transfer rate for the client-server connection through a selection made at a user interface.

13. The method of claim 1, wherein if no encoded bit rate is detected, the method further comprises an act of the server computer system setting the first transfer rate to the maximum allowable rate for the client-server connection.

14. The method of claim 1, further comprising an act of the server computer system presenting a user interface that allows a user to enter information including a data portion data type, size, encoded bit rate, playback duration, initial amount in total size, initial amount as a percent of the data portion's total size, and initial amount as a percentage of time based on the data portion's playback duration.

15. The method as recited in claim 1, wherein receiving the request from the client computer system for data that is to be presented to the user at the client computer system comprises receiving a request for a media file to be played back at the client computer system, and wherein the method further includes:
   an act of receiving an indication that a user has terminated playback of the media file; and
   an act of ceasing data transfer to the client computer system, such that bandwidth and server resources are conserved.

16. The method of claim 1, further comprising an act of the server computer system including a schema in a media file that indicates how the media file's header is to be parsed such that the encoded bit rate for the media file is detectable.

17. The method of claim 1, wherein the second transfer rate for transferring the remaining data is determined based on the physical, stored location of a media file.

18. The method of claim 1, wherein the second transfer rate for transferring the remaining data is determined based on a available bandwidth between the client computer system and the server computer system.

19. The method of claim 1, wherein the first and second transfer rates are individually settable for different media files.

20. The method recited in claim 1, wherein the first transfer rate is a maximum transfer rate at which the client computer system is capable of receiving data over the client-server connection and in which the second transfer rate is a transfer rate that is greater than 100% of the encoded bit rate.

21. The method recited in claim 1, wherein the method further includes:
   an act of the server computing system receiving an indication that a user has paused presentation of the requested data at the client computer system;
   an act of the server computing system ceasing data transfer to the client computer system, such that bandwidth and server resources are conserved;
   subsequent to ceasing data transfer, and act of the server computing system receiving an indication that the user has resumed presentation of the requested data at the client computer system; and
   an act of the server computing system resuming data transfer to the client computer system.

22. One or more computer-readable storage devices having thereon computer-executable instructions that, when executed by one or more processors of a server computing system, cause server computing system to perform a method comprising:
   an act of the server computing system receiving a request from a client computer system for data that is to be transferred to the client computer system;
   subsequent to receiving the request from the client computer system, an act of the server computing system accessing a portion of the requested data, the requested data encoded at a bit rate and including both an initial amount of data to be transferred to the client computer system as an initial data burst at the encoded bit rate as well as remaining data to be transferred to the client computer system subsequent to the initial data burst and at the encoded bit rate;
   an act of the server computing system determining the encoded bit rate from the accessed portion of the requested data;
   based on the determined encoded bit rate of the requested data:
      an act of the server computing system determining a size of the initial amount of data that is to be transferred to the client computer system at the encoded bit rate and at a first transfer rate as the initial data burst to enable prompt access by the client computer system to that portion of data, the first transfer rate being greater than the encoded bit rate; and
      prior to transferring the initial amount of data or remaining data to the client computer system, an act of the server computing system determining a second transfer rate for transferring the remaining data to the client computer system, the second transfer rate for the remaining data being lower than the first transfer rate for the initial amount of data and equal to or greater than the encoded bit rate;
   subsequent to determining the second transfer rate for transferring the remaining data to the client computer system, an act of the server computing system transferring the initial amount of data to the client computer system at the encoded bit rate and at the first transfer rate as the initial data burst; and
   an act of the server computing system transferring the remainder of the requested data to the client computer system at the encoded bit rate and at the second transfer rate, which is lower than the first transfer rate, subsequent to transferring the initial amount of data at the encoded bit rate and at the first transfer rate.

* * * * *